(12) United States Patent
Suzuki

(10) Patent No.: US 8,606,464 B2
(45) Date of Patent: Dec. 10, 2013

(54) STEERING ASSIST SYSTEM FOR MOTORCYCLE

(75) Inventor: Osamu Suzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 587 days.

(21) Appl. No.: 12/289,395

(22) Filed: Oct. 27, 2008

(65) Prior Publication Data

US 2009/0139793 A1    Jun. 4, 2009

(30) Foreign Application Priority Data

Nov. 30, 2007   (JP) .................................. 2007-310104

(51) Int. Cl.
*G06F 7/00*   (2006.01)
*B62D 61/00*   (2006.01)

(52) U.S. Cl.
USPC ............................................ 701/42; 180/219

(58) Field of Classification Search
USPC ...................... 701/41, 42; 180/219
See application file for complete search history.

(56) References Cited

U.S. PATENT DOCUMENTS

| | | | |
|---|---|---|---|
| 6,863,150 B1 * | 3/2005 | Tanaka et al. | 180/446 |
| 7,006,901 B2 * | 2/2006 | Wang | 701/1 |
| 7,497,294 B2 * | 3/2009 | Tsujii et al. | 180/219 |
| 7,648,000 B2 * | 1/2010 | Kimura | 180/219 |
| 7,693,632 B2 | 4/2010 | Seidl | |
| 7,860,624 B2 * | 12/2010 | Kubota et al. | 701/41 |
| 7,878,292 B2 * | 2/2011 | Hikichi et al. | 180/442 |

FOREIGN PATENT DOCUMENTS

| | | |
|---|---|---|
| DE | 10 2005 047 144 A1 | 4/2007 |
| DE | 10 2006 024 327 A1 | 11/2007 |
| EP | 1 780 109 A2 | 5/2007 |
| JP | 6-092254 A | 4/1994 |
| JP | 2003-285762 A | 10/2003 |
| JP | 2007-125917 | 5/2007 |

* cited by examiner

*Primary Examiner* — Kevin Hurley
(74) *Attorney, Agent, or Firm* — Squire Sanders (US) LLP

(57) ABSTRACT

A steering assist system for a motorcycle includes an actuator configured to provide a steering torque to steering of a motorcycle. A target-torque calculation unit is configured to obtain a target-torque for the steering, on a basis of a state of the motorcycle. A torque detecting unit is configured to detect a steering torque. A torque control unit is configured to drive an actuator on a basis of a deviation between the target torque obtained from the target-torque calculation unit and the steering torque obtained from the torque detecting unit.

15 Claims, 9 Drawing Sheets f1 : LATERAL G / STEERING-TORQUE GAIN
f2 : STEERING-ANGLE ACCELERATION / STEERING-TORQUE GAIN

STEERING ASSIST SYSTEM FOR MOTORCYCLE

BACKGROUND OF THE INVENTION

1. Field of the Invention

The present invention relates to a steering assist system for a motorcycle. In particular, it relates to a steering assist system including an actuator that gives a steering torque to steering.

2. Description of the Related Art

A variety of control techniques have been developed to further improve the running stability of a motorcycle. A known example of techniques to improve the running stability is a steering damper. Japanese Patent Application Publication No. 2007-125917 proposes another example of such techniques in which an actuator is provided to actively control the steering system (specifically, the rear wheel).

In the technique disclosed in the above-mentioned patent document, the steering of the rear wheel is based on the target steering angle and the delayed steering angle for the rear wheel that are determined in accordance with the vehicle speed and the roll rate.

Incidentally, motorcycles are inevitably more prone to external influences, such as an irregular ground surface and a crosswind, than four-wheel automobiles. The external influences cause wobbles in the steering, and it is desirable to reduce the steering wobbles of motorcycles.

The active-control technique in the example of the above-mentioned patent document is basically the position control of the steering angle. Accordingly, the technique is applicable to the controlling of the rear wheel, but it is actually difficult to apply the technique to the front wheel that is directly operated by the rider.

In addition, the technique in the example of the above-mentioned patent document basically aims to improve the performance at the time of changing lanes or of giving a turn. Reducing the steering wobbles caused by the external influences is out of concern to the above-mentioned patent document.

SUMMARY OF THE INVENTION

The present invention is made in view of the above-described problems, and aims to provide a steering assist system for a motorcycle capable of further reducing the rolling of the vehicle body and the steering wobbles caused by the external influences, such as an irregular ground surface and a crosswind.

In one embodiment, a steering assist system for a motorcycle according to the invention includes an actuator that gives a steering torque to the steering of a motorcycle. A target-torque calculation unit obtains a target torque for the steering on the basis of the state of the motorcycle. A torque detecting unit is configured to detect a steering torque. A torque control unit is configured to drive the actuator on the basis of a deviation between the target torque obtained from the target-torque calculation unit and the steering torque obtained from the torque detecting unit.

In another embodiment, a steering assist system for a motorcycle according to the invention includes actuator means for providing a steering torque to steering of a motorcycle. A target-torque calculation means is provided for obtaining a target torque for the steering on a basis of a state-of-the-art motorcycle. A torque detecting means is provided for detecting a steering torque. A torque control means is provided for driving the actuator means on a basis of a deviation between the target torque obtained from the target-torque calculations and the steering torque obtained from the torque detecting means.

In another embodiment of the invention, a method for steering assist in a motorcycle includes providing a steering torque to steering of a motorcycle via an actuator. A target torque for the steering is obtained on a basis of a state of the motorcycle. A steering torque is detected, and the actuator is driven on a basis of a deviation between the target torque and the steering torque.

In the steering assist system according to embodiments of the present invention, the torque control is executed on the basis of the deviation between the target torque and the actual steering torque. Accordingly, the rolling of the vehicle body and the steering wobbles caused by the external influences, such as an irregular ground surface and a crosswind can be reduced furthermore.

DESCRIPTION OF THE PREFERRED EMBODIMENTS

A steering assist system according to certain embodiments of the present invention will be described with reference to the accompanying FIGS. 1 to 9. A steering assist system 10 of this embodiment is mounted on a motorcycle 11. So, the description starts with that of the motorcycle 11.

Figure 1:
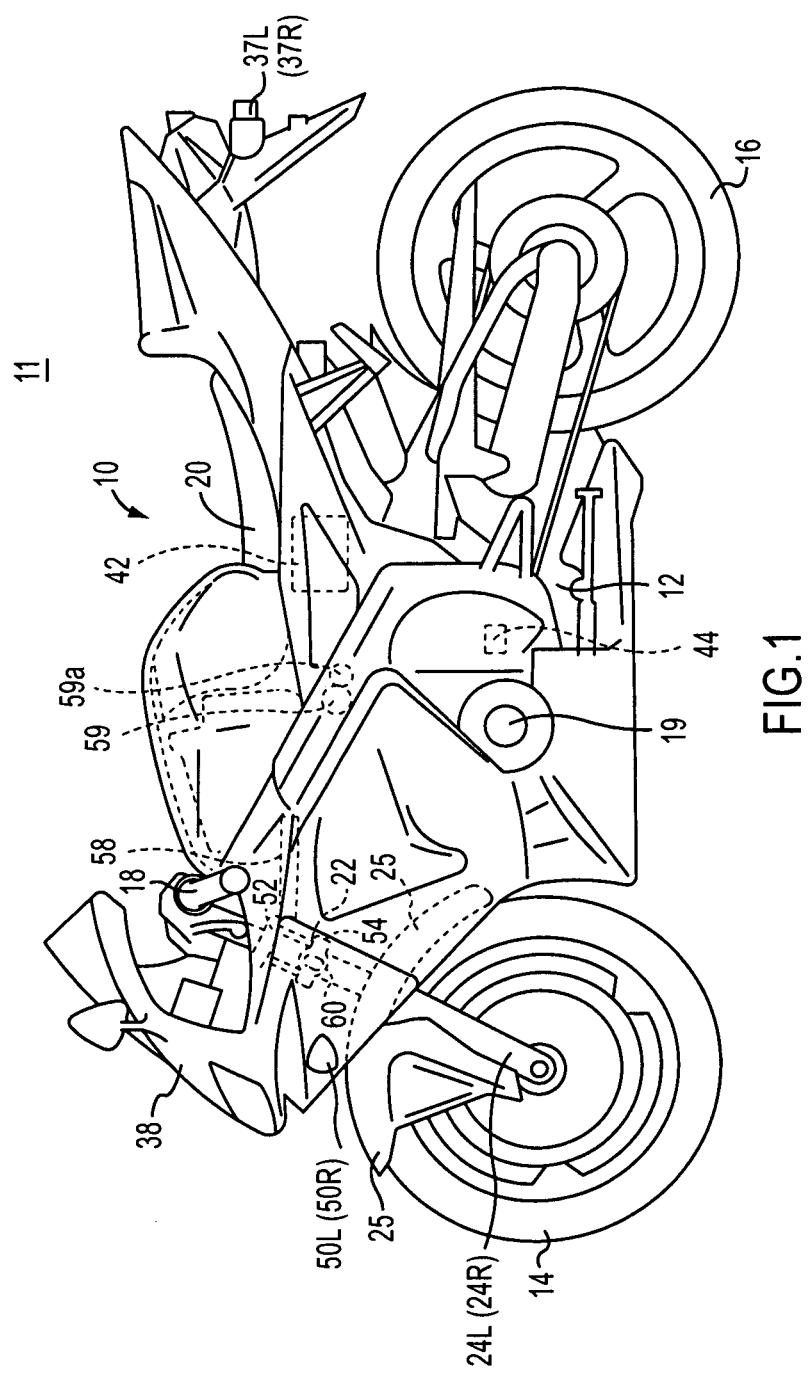
FIG. 1 is a side view of a motorcycle on which a steering assist system according to an embodiment of the present invention is mounted.

Note that the description given in this embodiment is based on motorcycle 11 being a full-cowl type motorcycle as FIG. 1 shows. The motorcycle of this type, however, is only an example of the present invention. The present invention is also applicable to other types of motorcycles, such as scooters and other types. In addition, there are some mechanisms or constituent elements that are provided in pairs to the motorcycle 11; one on the right-hand side of the vehicle body and another on the left-hand side thereof. For these mechanisms and constituent elements, each of those on the left-hand side are given a letter L added to their respective reference numerals while each of those on the right-hand side are given a letter R added to their respective reference numerals. Moreover, the right-hand side mentioned in the following description is referred to the right-hand side of the vehicle body from the viewpoint of the rider seated on the motorcycle 11 while the left-hand side is referred to the left-hand side of the vehicle body from the same viewpoint.

As FIG. 1 shows, the motorcycle 11 can include a cradle-type vehicle-body frame 12 that forms a vehicle body. and a front wheel 14 that is a steering wheel. A rear wheel 16 is a drive wheel, and a handlebar 18 steers the front wheel 14. A seat 20 is provided, on which the rider is seated. An engine 19 is also provided to drive the rear wheel 16 via an unillustrated transmission.

Figure 2:
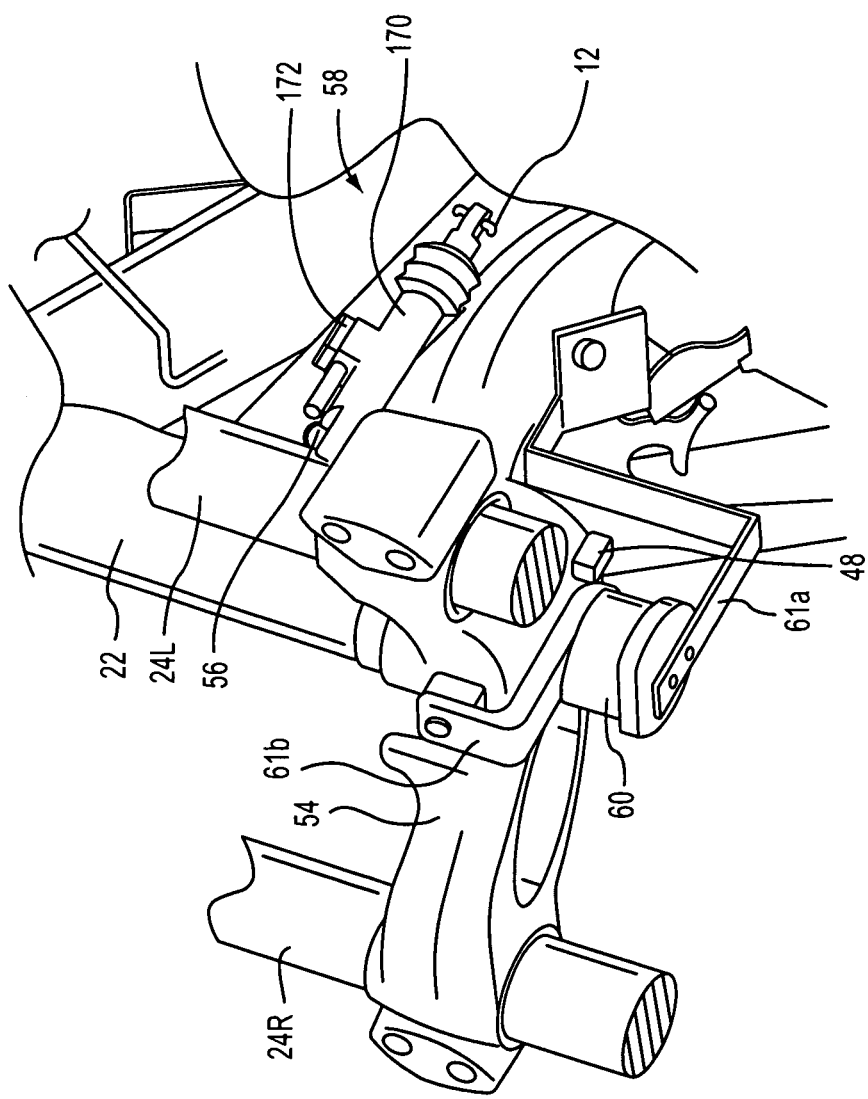
FIG. 2 is a perspective view of a composite sensor disposed in a lower portion of a head pipe of the motorcycle.

As FIGS. 1 and 2 illustrate, a top bridge 52 can be coupled to the handlebar 18 disposed in the front portion of the vehicle body. Front forks 24L and 24R are coupled respectively to left-hand side portion and the right-hand side portion of the top bridge 52. The front forks 24L and 24R penetrate a bottom bridge 54, and pivotally support the front wheel 14 so as to allow the rotation of the front wheel 14. A composite sensor 60 is attached to a central part of the bottom bridge 54. The bottom surface of the composite sensor 60 is fixed to a bracket 61a, which is in turn fixed to the vehicle-body frame 12. A rotating board 66 is disposed on the top surface of the composite sensor 60 (see FIG. 3) and fixed to a bracket 61b, which is in turn fixed to the bottom bridge 54.

Now, suppose that the handlebar 18 is steered to the left or to the right by the rider on the seat. The handlebar 18, the top bridge 52, the front forks 24L and 24R, the bottom bridge 54, and the front wheel 14 can be moved together rotationally about a head pipe 22 thus a central axis, by the above-mentioned steering action of the rider. With this rotational movement, the rotating board 66 disposed on the top surface of the composite sensor 60 is made to rotate by the bracket 61b.

A front fender 25, to cover the front wheel from above is attached to the front forks 24L and 24R. Accordingly, as FIG. 2 clearly shows, an unoccupied space where no other component parts are disposed is left below the bottom bridge 54, and the space thus left is suitable for attaching the composite sensor 60. In addition, the front fender 25 provides the composite sensor 60 with a protection against intruding water, the mud, the sand, and the like that splash up from below.

Directional indicators 50L and 50R can be disposed on the front side of a cowl 38 of the motorcycle 11 while directional indicators 37L and 37R can be disposed on the rear side of the motorcycle 11. A controller 42 is disposed below the seat 20, and electrically controls the motorcycle 11. A vehicle-speed sensor (vehicle-speed detecting means) 44 is disposed near the engine 19, and detects the vehicle speed calculated on the basis of engine revolutions, gear ratio, and the like.

Figure 4:
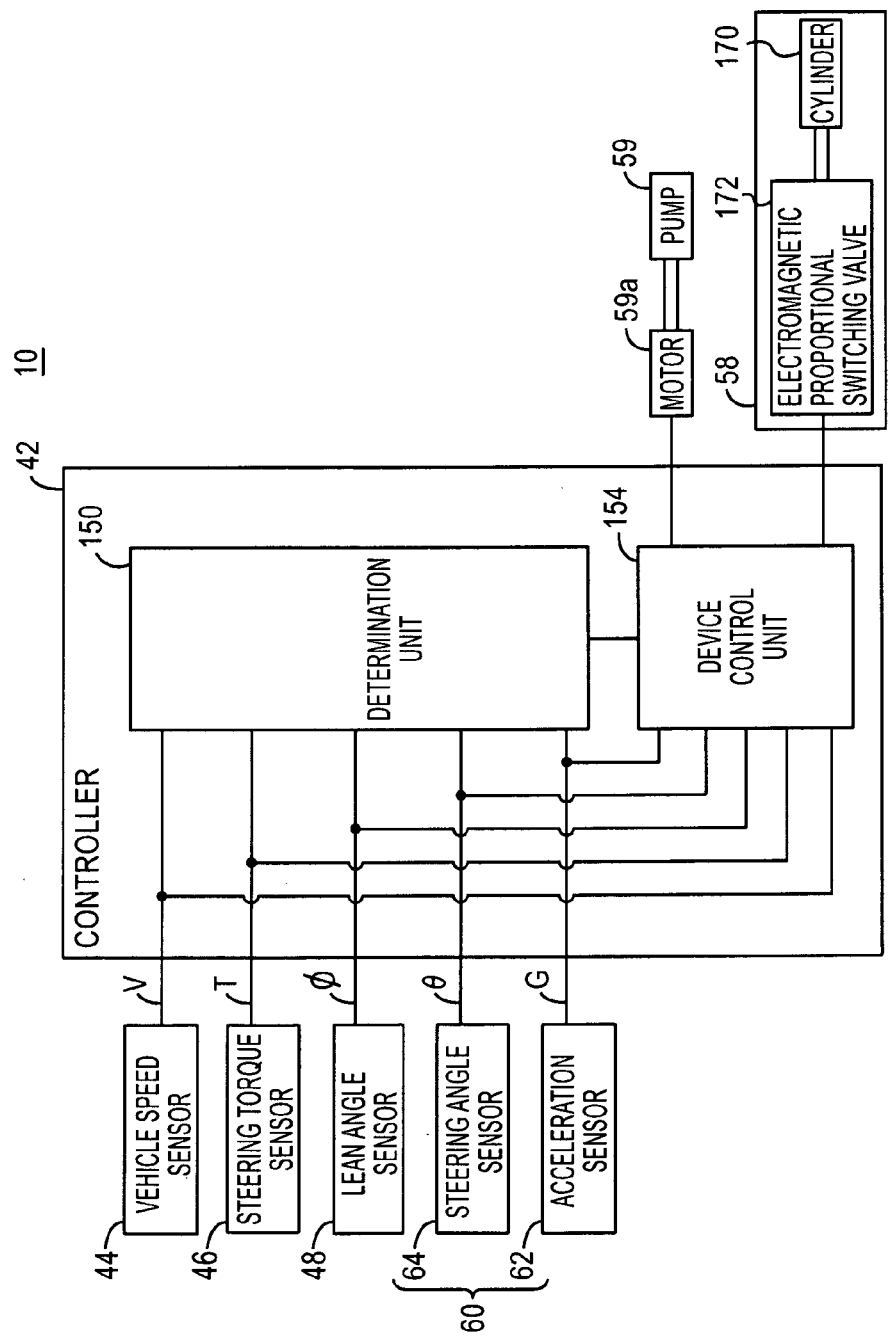
FIG. 4 is a block configuration diagram of the steering assist system according to the embodiment of the present invention.

A steering-torque sensor (torque detecting means) 46 is disposed in the head pipe 22 (see FIG. 4). The steering-torque sensor 46 detects the steering torque of the handlebar 18. In addition, a lean-angle sensor (lean-angle detecting means) 48 is disposed on the bottom-end portion of the bottom bridge 54, and detects the lean-angle (i.e., the roll angle) of the motorcycle 11. The detecting of the steering torque and the lean-angle does not necessarily depend on sensors, but these angles may be calculated from predetermined parameters.

A post 56 is disposed near the head pipe 22 and works with the handlebar 18. The role of the post 56 may also be performed by other members, such as a specially-formed part of the bottom bridge 54. A steering assist apparatus 58 is disposed between the post 56 and the vehicle-body frame 12. A hydraulic pump (fluid-pressure increasing-and-decreasing means) 59 is disposed near the engine 19.

Figure 3:
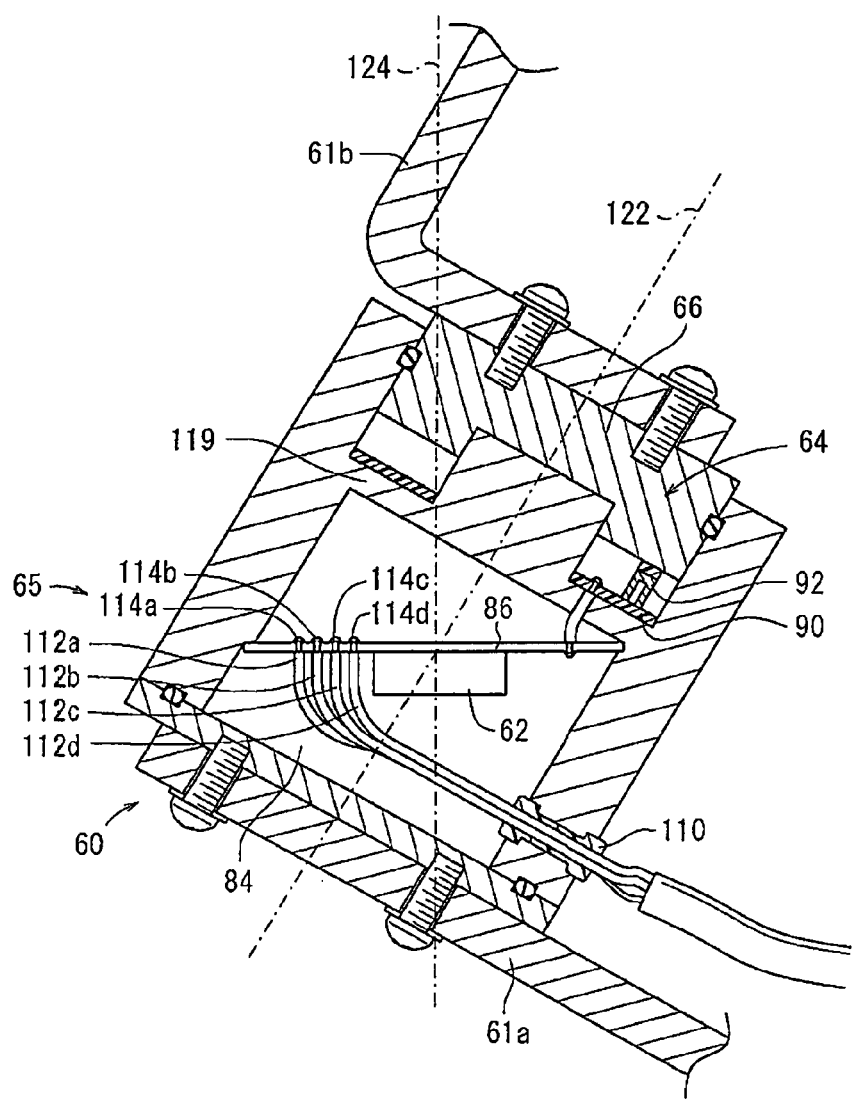
FIG. 3 is a sectional plan view of the composite sensor.

As FIG. 3 shows, in this embodiment the composite sensor 60 can include a steering-angle sensor (steering-angle detecting means) 64 to detect the steering angle of the handle 18 of the motorcycle 11 (see FIGS. 1 and 2). An acceleration sensor (acceleration detecting means for detecting the acceleration in the vehicle-width direction) 62 can be provided to detect the G-force produced in accordance with the roll angle of the motorcycle 11 (the angle that is made, with a vertical line, by the motorcycle 11 when leaned over to the right or to the left in the vehicle-width direction). A case 65 can be provided, in which a unit composed of the steering-angle sensor 64 and the acceleration sensor 62 can be installed. Rotating board 66 is placed on the top. The acceleration sensor 62 can be formed by a semiconductor element, or similar device, and can be readily available. The steering-angle sensor 64 can a potentiometer, or similar device and is also readily available.

The bottom surface of the case 65 can be connected to the bracket 61a while the rotating board 66 is connected to the bracket 61b. A partition wall 119 is formed inside the case 65. A base board 90 can be provided on the top surface of the partition wall 119. A space 84 is formed below the partition wall 119. A base board 86 is disposed in the space 84 so as to be placed horizontally in the reference state. A resistive element (for example, an element made of conductive plastics) can be disposed on the top surface of the base board 90. The resistive element has, in this example, an arc shape when viewed from above. A conductive brush 92 can be disposed on the bottom portion of the rotating board 66, and moves sliding against the resistive element of the base board 90. The resistive element and the conductive brush 92 together form the steering-angle sensor 64. A cable or other suitable means can be provided to connect the two base boards 90 and 86, and makes it possible to supply the signal of the steering-angle sensor 64 to the controller 42 via the base board 86. It should be noted that the steering-angle sensor may be replaced with, for example, a torque sensor.

The acceleration sensor 62 can be disposed on the bottom surface of the base board 86. Accordingly, the base board 86 and the acceleration sensor 62 are disposed in the space 84 perpendicularly to a vertical axis 124 and substantially in a horizontal position. Base board 86 and the acceleration sensor 62 are inclined to a central axis 122 by a certain predetermined angle (an angle that the central axis 122 and the vertical axis 124, that is, the caster angle). Cables 112a to 112d can be connected to the base board 86 with solders 114a to 114d, respectively, or by other suitable connection means. Cables 112a to 112d extend out of the case 65 through a rubber grommet 110, and then are bound together into a harness 113, which can then be connected to the controller 42. Plural sealing members are provided to the composite sensor 60 for the purpose of preventing moisture, dust and the like from being taken into the inside of case 65.

As FIG. 4 illustrates, vehicle-speed sensor 44, steering-torque sensor 46, lean-angle sensor 48, steering-angle sensor 64, and acceleration sensor 62 can be connected to controller 42. Signals representing the vehicle speed V, the steering torque T, the lean-angle $\phi$, the steering angle $\theta$, and the G-force G that are detected by the above-mentioned sensors are supplied to controller 42. Note that the value of each of the steering torque T, the lean-angle $\phi$, and the steering angle $\theta$ is zero when handlebar 18 is in the reference state (that is, while the motorcycle 11 is running straight).

The controller 42 can include a determination unit 150 and a device-control unit 154. The determination unit executes a determination processing on the basis of the vehicle speed V, steering torque T, lean-angle $\phi$, steering angle $\theta$, and G-force G. The device-control unit 154 can control the steering assist apparatus 58 and motor 59a of the hydraulic pump 59. The controller 42 can also include a CPU (Central Processing Unit), which serves as a principal controlling unit, a RAM (Random Access Memory) and a ROM (Read Only Memory), which serves as a memory unit, a driver, and the like. To implement the function of the controller 42, the CPU can load a program, work in conjunction with the memory unit and the like, and thus executes software processing.

Figure 5:
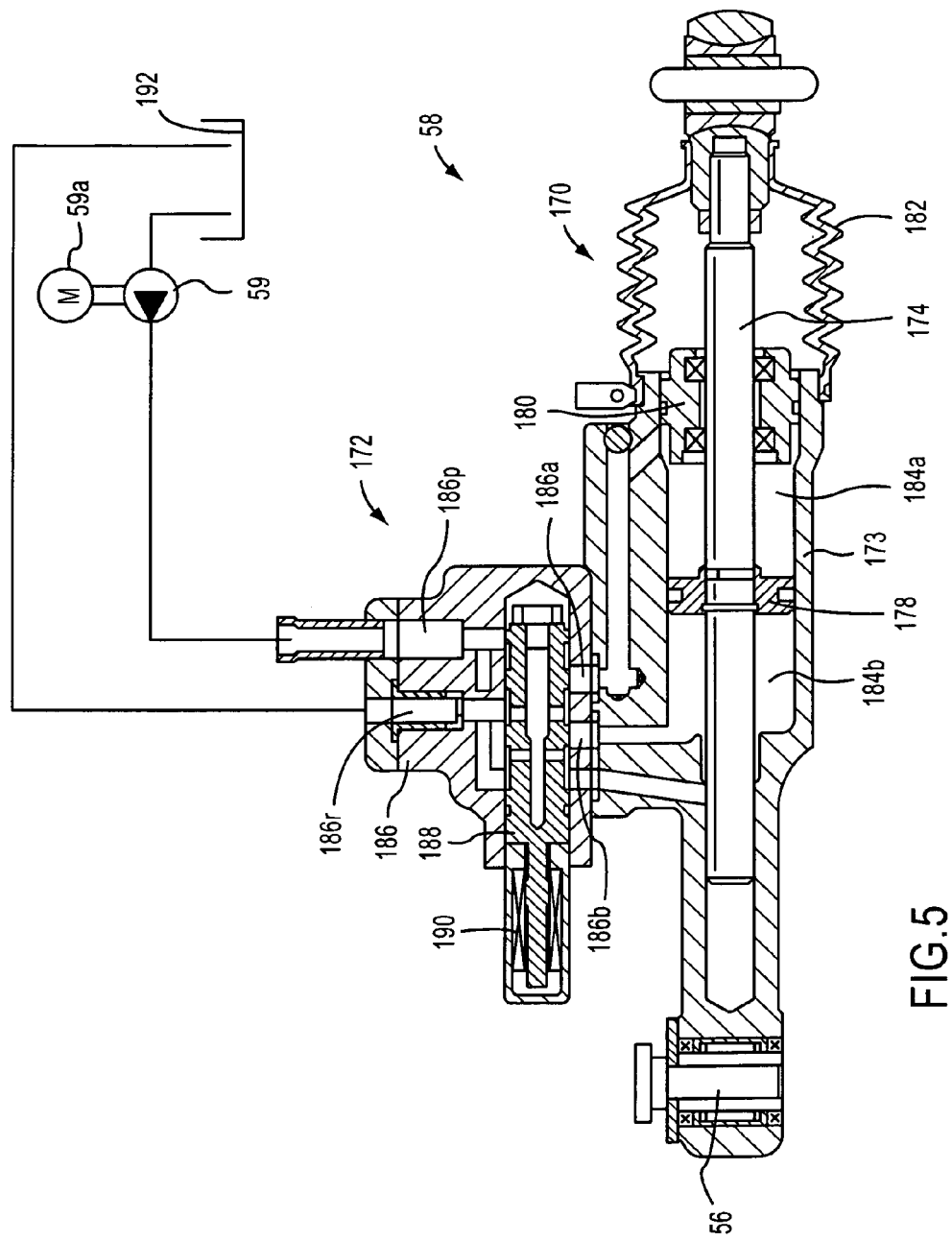
FIG. 5 is a sectional side view of a steering assist apparatus.

As FIG. 5 shows, the steering assist apparatus 58 can include a cylinder (actuator) 170 and an electromagnetic proportional switching valve 172. On a side of the cylinder 170, an end portion of a cylinder tube 173 can be rotatably connected to the post 56 while, on the other side of the cylinder 170, an end portion of a rod 174 is rotatably connected to a portion of the vehicle-body frame 12. The cylinder 170 is designed to give a rotational torque to the steering. The steering torque mentioned here is a torque that has a direction to either increase or decrease the load of the steering action. In addition, the steering torque may be either the one that is given actively or the one that is induced passively.

A piston 178 is provided on the rod 174, and moves back and forth inside the cylinder tube 173. No means (for example, an orifice) for communicatively connecting the two sides of the piston 178—specifically, pressure-receiving chambers 184a and 184b—is formed in the piston 178. The rod 174 is supported by a sealing member 180 disposed on an end portion of the cylinder tube 173. A part of the rod 174 sticks out of the sealing member 180, and the part is covered with a bellows-type boot 182. A manifold structure is formed in the top portion of the cylinder 170, and the electromagnetic proportional switching valve 172 is integrated with the manifold-shaped top portion.

The hydraulic pump 59 supplies a hydraulic fluid to the cylinder 170. The electromagnetic proportional switching valve 172 switches the supply of the hydraulic fluid thus supplied so that the hydraulic fluid can be supplied only either one of the pressure-receiving chambers 184a and 184b each of which is located on either side of the piston 178 inside the cylinder 170. The electromagnetic proportional switching valve 172 includes: a body 186; a spool 188, which moves back and forth inside the body 186; and a solenoid 190, which drives the spool 188. An input port 186p is formed in the body 186 and the hydraulic fluid is supplied to the input port 186p. The electromagnetic proportional switching valve 172 switches and selects which of the passages the hydraulic fluid in the input port 186p is then taken into. To put it differently, the electromagnetic proportional switching valve 172 communicatively connects the input port 186p with either an A-port 186a or a B-port 186b. Of the A-port 186a and the B-port 186b, the one that is not communicatively connected to the input port 186p is communicatively connected to a return port 186r, which is then communicatively connected to a tank 192. It should be noted that the A-port 186a and the B-port 186b are communicatively connected respectively to the pressure-receiving chambers 184a and 184b of the cylinder 170.

Under the operation of the controller 42, the solenoid 190 proportionally controls the spool 188 so that the hydraulic fluid can be proportionally supplied from the input port 186p to any one of the pressure-receiving chambers 184a and 184b. In the meanwhile, the other one of the pressure-receiving chambers 184a and 184b is communicatively connected to the tank 192. Here, the solenoid 190 may be disposed on each of the two sides of the spool 188 so as to correspond to the drive direction of the spool 188. The electromagnetic proportional switching valve 172 need not be a proportional valve, but may be a simple switching valve. The use of a proportional electromagnetic valve, however, allows the valve to respond to various situations, and thus a more accurate control is accomplished.

The hydraulic pump 59 is rotated by the motor 59a. The hydraulic pump 59 sucks out the liquid (usually, oil) stored in the tank 192, pressurizes the liquid, and then supplies the liquid to the electromagnetic proportional switching valve 172. Under the operation of the controller 42, the motor 59a is controlled so as to vary the speed and/or the torque. Accordingly, the revolutions and/or the torque of the hydraulic pump 59 are changed so as to adjust the pressure of the hydraulic fluid acting on the electromagnetic proportional switching valve 172. It should be noted that the hydraulic pump 59 with the motor 59a is not the only means for adjusting the pressure of the hydraulic fluid acting on the electromagnetic proportional switching valve 172. For example, the adjustment of the pressure may be achieved using a swash-plate pump. To be more specific, the adjustment of the pressure may be achieved by adjusting the inclination angle of the swash plate. Alternatively, a pressure-adjustment electromagnetic proportional valve may be employed for the adjustment of the pressure. In addition, a pressure-compensated means (for example, a relief valve) may be disposed between the hydraulic pump 59 and the electromagnetic proportional switching valve 172.

Subsequently, the steering assist system 10 will be described below.

Figure 6:
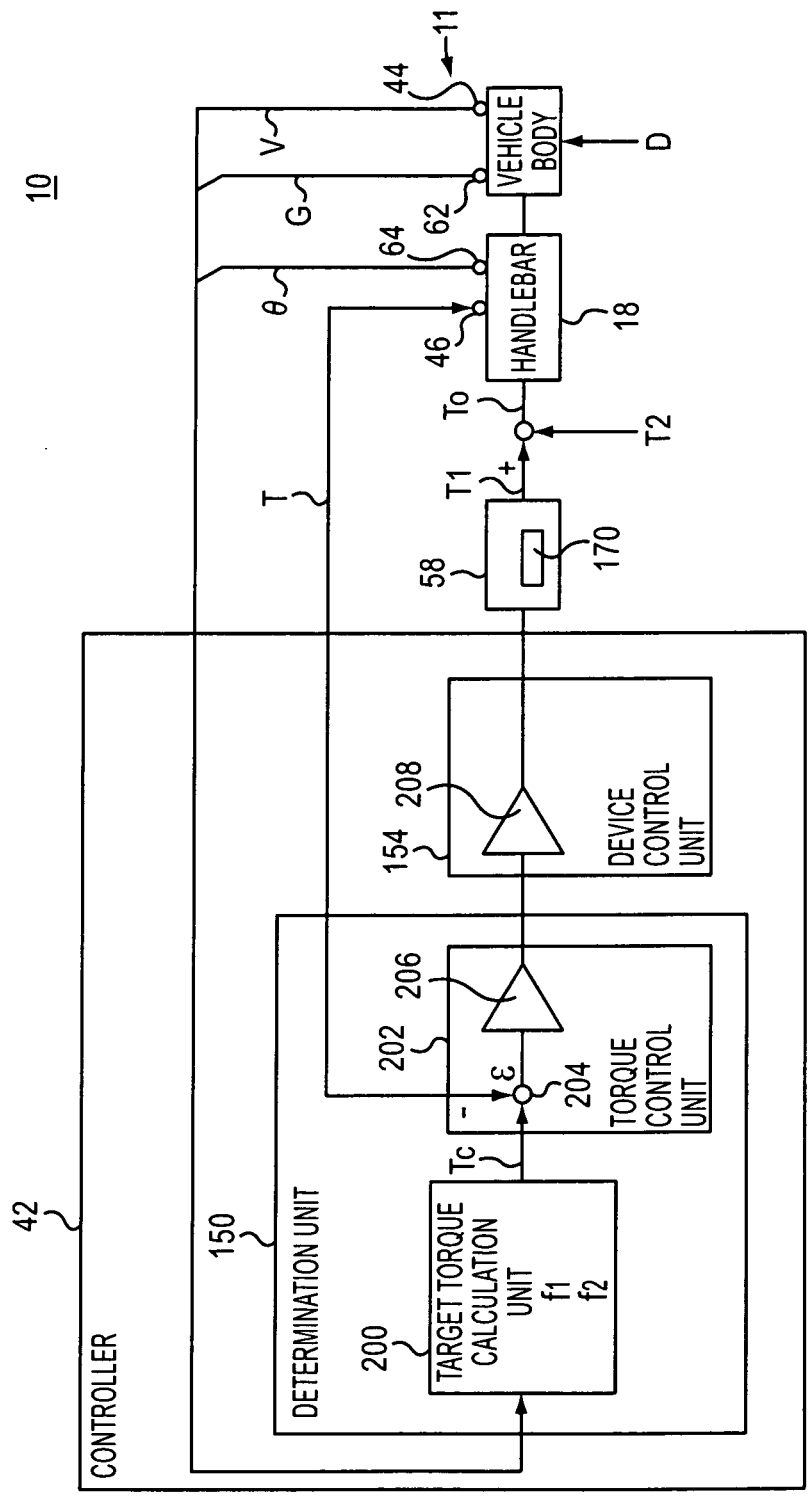
FIG. 6 is a diagram illustrating a control loop of the steering assist system according to the embodiment of the present invention.

As FIG. 6 shows, the steering assist system 10 can include the steering assist apparatus 58, a target-torque calculation unit 200, which acquires the target torque Tc of the steering (that is, of the handlebar 18) on the basis of the state of the motorcycle 11, and a torque control unit 202, which drives the steering assist apparatus 58 on the basis of the deviation $\epsilon$ between the target torque Tc and the steering torque T obtained by the steering-torque sensor 46. The target torque Tc is a torque needed to stabilize the behavior of the vehicle body.

In addition, the steering assist system 10 can include the steering-angle sensor 64, which detects the steering angle $\theta$, the acceleration sensor 62, which detects the acceleration G (i.e., G-force) in the vehicle-width direction, and the vehicle-speed sensor 44, which detects the vehicle speed V. The quantity of state thus obtained by these sensors 64, 62, and 44 for the motorcycle 11 is the quantity obtained by summing up the quantity of state caused by the operation by the rider (the steering, the accelerating, the braking, the shifting of the body weight, and so forth) and the quantity of state caused by the external influences D, such as a irregular ground surface and a crosswind.

The target-torque calculation unit 200 can obtain the target torque Tc on the basis of the steering angle $\theta$, the acceleration G in the vehicle-width direction, and the vehicle speed V. The angular velocity obtained through a first-order differential processing (executed by a steering-angle-state detecting means) and the angular acceleration a obtained through the second-order differential processing (executed by the steering-angle-state detecting means) are available for the steering angle $\theta$. The acceleration G, steering angle $\theta$, angular velocity $\omega$, and the angular acceleration a can be generated either in the left-hand direction or in the right-hand direction, so that these values can be either positive or negative. For the sake of easy understanding, the following description is based on an example where all of these values are positive.

In the torque control unit 202, the deviation $\epsilon$ between the steering torque T0 and the target torque Tc is obtained at a subtraction point 204, and a predetermined control compensation (for example, a PID compensation) is executed by a compensation unit 206. In summary, a feed-back control based on the steering torque T0 is carried out by the steering assist system 10. Note that the steering torque T0 mentioned here is the torque acting actually on the handlebar 18. To put it differently, the steering torque T0 is the total torque obtained by summing up the torque T1 executed by the steering assist apparatus 58 and the torque T2 executed by the steering action of the rider.

The function of the torque control unit 202 can be implemented by a software processing that is repeatedly executed for every short period of time, an analog circuit, and the like. The target-torque calculation unit 200 and the torque control unit 202 are provided in the determination unit 150. The signal on the control amount obtained by the torque control unit is amplified by an amplifier 208 in the device control unit 154, and the amplified signal is then supplied to the steering assist apparatus 58 and the motor 59a. The device control unit 154 obtains the direction and the amount of the switching of the electromagnetic proportional switching valve 172 on the basis of the supplied signal, and executes the control.

Subsequently, the calculation procedure of the target torque Tc by the target-torque calculation unit 200 will be described below. Steps S1 to S6 shown in FIG. 7 can be repeatedly executed for every predetermined short period of time.

Figure 7:
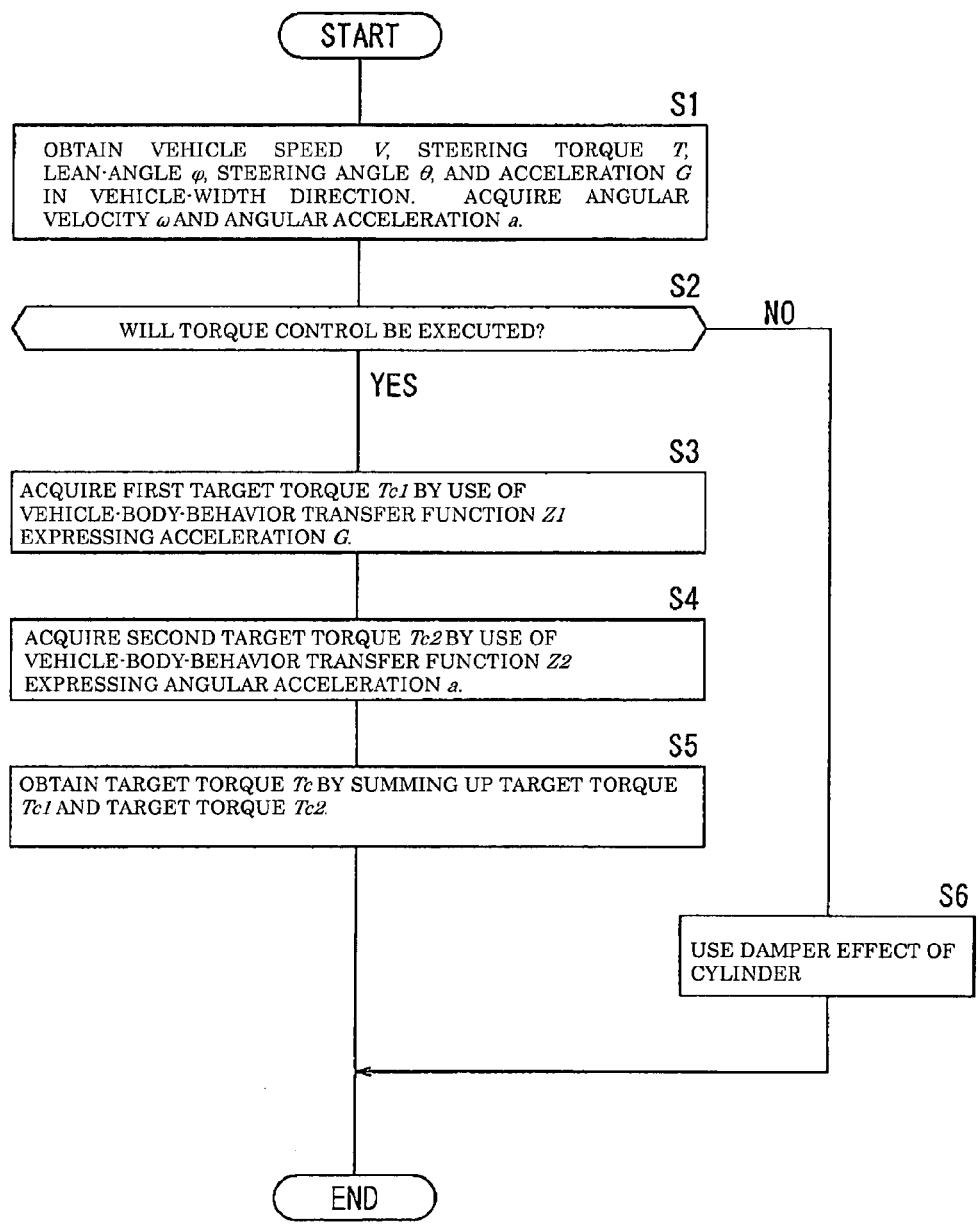
FIG. 7 is a flowchart illustrating a control procedure executed in the steering assist system.

At step S1 of FIG. 7, the vehicle speed V, the steering torque T, the lean-angle φ, the steering angle θ, and the acceleration G in the vehicle-width direction at a certain point of time are obtained from the vehicle-speed sensor 44, the steering-torque sensor 46, the lean-angle sensor 48, the steering-angle sensor 64, and acceleration sensor 62. In addition, the angular velocity ω and the angular acceleration a are obtained by differentiating the steering angle θ.

Figure 8:
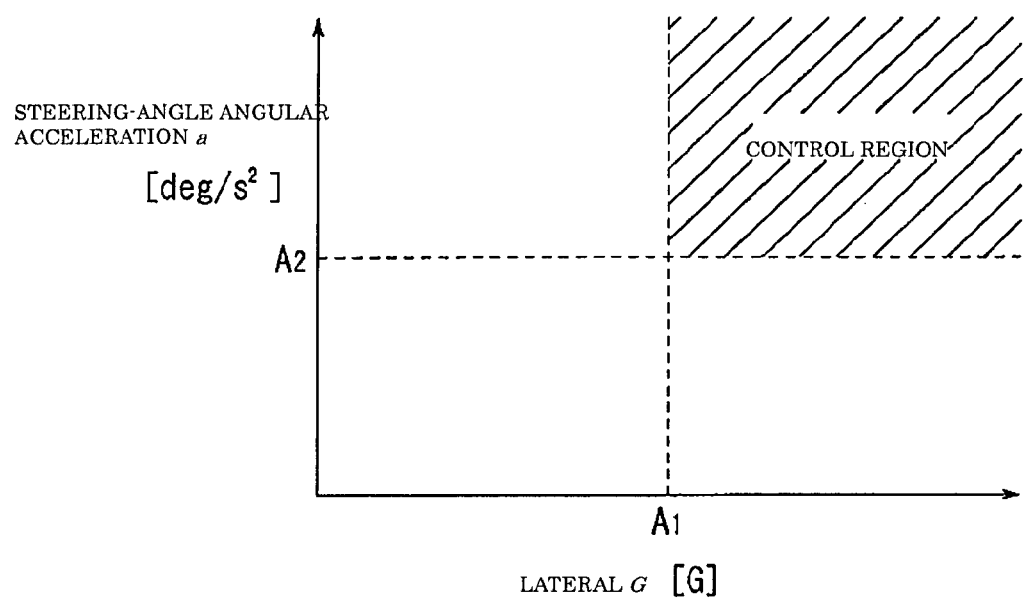
FIG. 8 is a chart illustrating a control region determined by the acceleration in the vehicle-width direction and the angular acceleration of the steering.
Figure 9:
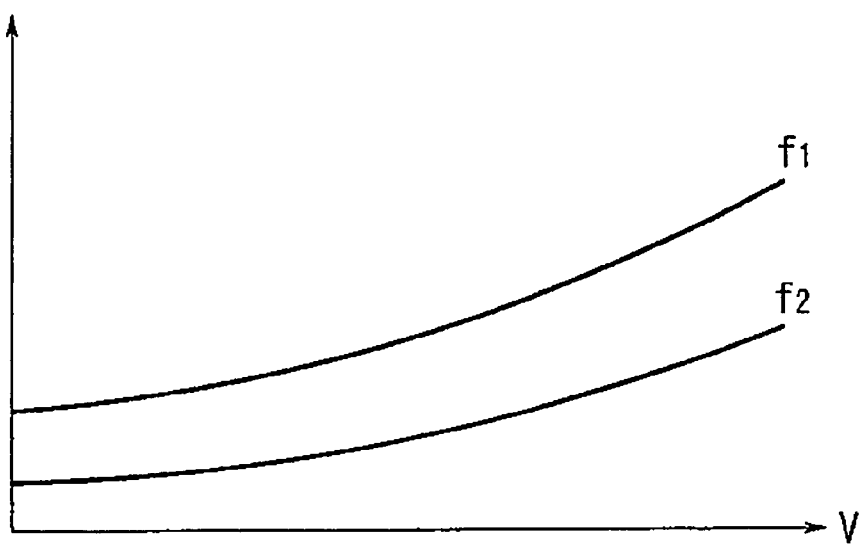
FIG. 9 is a graph showing the variable gain of a vehicle-body-behavior transfer function Z1 and the variable gain of a vehicle-body-behavior transfer function Z2.

At step S2, whether a torque control is to be executed or not is determined. To be more specific, as FIG. 8 shows, the torque control is executed for a control region defined by an acceleration G in the vehicle-width direction of $A_1$ or larger and an angular acceleration a of the steering of $A_2$ or larger. For the control region, a steering torque is given to the handlebar 18 by driving the cylinder 170 of the steering assist apparatus 58.

The threshold $A_1$ is set at a value corresponding to the acceleration in the vehicle-width direction that is only achievable with such external influences as a crosswind. The threshold $A_2$ is set at a value corresponding to the acceleration of the steering that is only achievable with such external influences as an irregular ground surface. In short, without any big external influences, the assist control by the steering assist system 10 is not actually executed. Accordingly, the steering assist system 10 exerts less influence on the operation by the rider. In particular, under ordinary running conditions, priority is given to the rider's own operation, so that the rider can enjoy inartificial, more natural, maneuverability. In the example shown in FIG. 8, the torque control is executed only when both of the two conditions are satisfied (AND-condition), but the torque control may be executed when either one of the two conditions is satisfied (OR-condition). Alternatively, different values of the steering torque may be applied between a case where the AND-condition is satisfied and a case where the OR-condition is satisfied.

In addition, thresholds $A_1$ and $A_2$ can be adjusted in accordance with the design conditions. For example, the thresholds $A_1$ and $A_2$ may be set so that even the existence of some external influences cannot trigger the torque control. To put it the other way, the torque control is executed only with the existence of external influences that is not easily brought under control by the operation of the rider.

When the torque control is executed, the operational flow proceeds to step S3. Conversely, when no torque control is executed, the operational flow proceeds to step S6.

At step S3, using a vehicle-body-behavior transfer function Z1 that expresses the acceleration G in the vehicle width direction with respect to the steering torque T0, a first target torque Tc1 is calculated by the inverse operation (i.e., $Z1^{-1}$). The vehicle-body-behavior transfer function Z1 is a function with the steering torque T0 as the input and the acceleration G as the output, and has a variable gain that depends on the vehicle speed V. The variable gain based on the vehicle speed V in the vehicle-body-behavior transfer function Z1 is shown as f1 in FIG. 9.

The vehicle-body-behavior transfer function Z1 has been acquired in advance, and is stored in a predetermined memory means. In the dynamic system represented by the vehicle-body-behavior transfer function Z1, the product of the acceleration G in the vehicle-width direction and the vehicle-body weight is defined as the external influence, which affects the steering.

At step S4, using a vehicle-body-behavior transfer function Z2 that expresses the angular acceleration a in the vehicle-width direction with respect to the steering torque T0, a second target torque Tc2 is calculated by the inverse operation (i.e., $Z2^{-1}$). The vehicle-body-behavior transfer function Z2 is a function with the steering torque T0 as the input and the angular acceleration a as the output, and has a variable gain that depends on the vehicle speed V. The variable gain based on the vehicle speed V in the vehicle-body-behavior transfer function Z2 is shown as f2 in FIG. 9.

The vehicle-body-behavior transfer function Z2 has been acquired in advance, and is stored in a predetermined memory means. In the dynamic system represented by the vehicle-body-behavior transfer function Z2, the product of the acceleration a in the vehicle-width direction and the inertia quantity of the steering is defined as the external influence, which affects the steering.

In an allowable practice concerning steps S3 and S4, the relationship between the steering torque and the acceleration G as well as the relationship between the steering torque and the angular acceleration a can be acquired in advance by, for example, testing with the motorcycle 11, and the acquired relationships are transformed into maps and then stored in memory or appropriate storage media. In this way, at steps S3 and S4, the target torques Tc1 and Tc2 needed to stabilize the vehicle-body behavior can be obtained appropriately and easily using the vehicle-body-behavior transfer functions Z1 and Z2.

At step S5, a final target torque Tc is calculated by summing up the two target torques Tc1 and Tc2. When either one of the two target torques Tc1 and Tc2 is, or is known to be, small enough, the calculation of the torque Tc may be omitted. After that, the calculated target torque Tc is supplied to the torque control unit 202.

At step S6 (i.e., NO at the determination of step S2), the damper effect by the cylinder 170 and the damper effect by the resistance of the passage are used, and the controller 42 executes no control on the hydraulic pump 59 and on the electromagnetic proportional switching valve 172.

After the steps S5 and S6, the processing of this time shown in FIG. 6 is terminated.

As has been described thus far, according to the steering assist system 10 of this embodiment, the torque control based on the deviation ε between the target torque Tc and the actual steering torque T0 makes it possible to further reduce the rolling of the vehicle body and the steering wobbles caused by the external influences, such as an irregular ground surface and/or crosswind.

The steering assist system 10 executes a feed-back control by means of the actual steering torque T including the torque T2 exerted by the steering action of the rider. Accordingly, when T2=T, the torque T1 to be added by the steering assist system 10 is zero. No unnecessary torque is therefore exerted. Only a necessary and sufficient torque is exerted, so that the rider can enjoy a natural maneuverability and riding experience. In addition, when the torque T2 that the rider exerts is unnecessarily large, a negative torque T1 is exerted, and the steering torque T can be kept at an appropriate level.

In addition, in this feed-back control, an appropriate compensation is executed by the compensation unit 206. Accordingly the steering wobbles of the handlebar 18 can be reduced and eventually terminated quickly and accurately.

Moreover, the target torque Tc can be obtained more appropriately on the basis of the steering angle θ, the angular velocity ω, the angular acceleration a, the acceleration G in the vehicle-width direction, and the vehicle speed V. Accordingly, the steering wobbles can be reduced furthermore. What should be noted here is the fact that the control according to a conventional technique includes neither a means for acknowledging the external influences caused by an irregular ground surface or by a crosswind, nor a means for securing the stability against the external influences. In contrast, according to the technique of this application, such external influences are acknowledged, and the control that deals with the external influences can be executed, so that the stability can be secured.

Furthermore, the torque control is executed only for the control region based on FIG. 8. Accordingly, the rider can enjoy the favorable maneuverability even during cornering and during lane changes.

The above-described embodiment is not the only form of the steering assist system according to the present invention. Various other configurations can be employed for the steering assist system without departing the scope of the present invention.

The metes and bounds of invention are defined only by the appended claims.

| Explanation of the Reference Numerals | |
|---|---|
| 10 | STEERING ASSIST SYSTEM |
| 11 | MOTORCYCLE |
| 12 | VEHICLE-BODY FRAME |
| 18 | HANDLEBAR |
| 42 | CONTROLLER |
| 44 | VEHICLE-SPEED SENSOR |
| 46 | STEERING-TORQUE SENSOR |
| 48 | LEAN-ANGLE SENSOR |
| 58 | STEERING ASSIST APPARATUS |
| 59 | HYDRAULIC PUMP |
| 59a | MOTOR |
| 60 | COMPOSITE SENSOR |
| 62 | ACCELERATION SENSOR |
| 64 | STEERING-ANGLE SENSOR |
| 150 | DETERMINATION UNIT |
| 154 | DEVICE CONTROL UNIT |
| 170 | CYLINDER |
| 172 | ELECTROMAGNETIC PROPORTIONAL SWITCHING VALVE |
| 190 | SOLENOID |
| 200 | TARGET-TORQUE CALCULATION UNIT |
| 202 | TORQUE CONTROL UNIT |
| 204 | SUBTRACTION POINT |
| 206 | COMPENSATION UNIT |
| 208 | AMPLIFIER |

I claim:

1. A steering assist system for a motorcycle, the motorcycle comprising a vehicle body including a front steering wheel and a rear drive wheel, a handlebar coupled to a head pipe and disposed on a front portion of the vehicle body, and a bridge mounted to the head pipe, the steering assist system comprising:

an actuator connected to the vehicle body and to the bridge, the actuator configured to provide a steering torque for steering of the motorcycle;

a steering torque sensor attached to the head pipe and configured to detect the steering torque provided by the actuator; and a controller mounted to the vehicle body and connected to the steering torque sensor and to the actuator;

the controller comprising a target torque calculation unit configured to obtain a target torque for the steering on a basis of a state of the motorcycle and a torque control unit configured to drive the actuator on a basis of a deviation between the target torque obtained from the target-torque calculation unit and the steering torque obtained from the torque detecting unit.

2. The steering assist system for a motorcycle according to claim 1, further comprising:

a steering angle sensor connected to the controller and configured to detect a state concerning a steering angle of the steering;

an acceleration sensor connected to the controller and configured to detect an acceleration in a vehicle-width direction of the motorcycle; and a vehicle-speed sensor connected to the controller and configured to detect a vehicle speed of the motorcycle, wherein the target-torque calculation unit obtains the target torque on a basis of the information obtained from the steering angle sensor, the acceleration in the vehicle-width direction obtained from the acceleration sensor, and the vehicle speed obtained from the vehicle-speed sensor.

3. The steering assist system for a motorcycle according to claim 2, wherein the information obtained from the steering angle sensor is a steering-angle acceleration, and when the acceleration in the vehicle-width direction is equal to or larger than a first predetermined value and the steering-angle acceleration is equal to or larger than a second predetermined value, the actuator is driven and provides a steering torque to the steering.

4. The steering assist system for a motorcycle according to claim 2, wherein the target-torque calculation unit obtains the target torque through an inverse operation using at least one of a vehicle-body-behavior transfer function that expresses the acceleration in the vehicle-width direction with respect to the steering torque, and a vehicle-body-behavior transfer function that expresses the steering-angle acceleration with respect to the steering torque.

5. The steering assist system for a motorcycle according to 3, wherein the target-torque calculation unit obtains the target torque through an inverse operation using at least one of a vehicle-body-behavior transfer function that expresses the acceleration in the vehicle width direction with respect to the steering torque, and a vehicle-body-behavior transfer function that expresses the steering-angle acceleration with respect to the steering torque.

6. A steering assist system for a motorcycle, the motorcycle comprising a vehicle body including a front steering wheel and a rear drive wheel, a handlebar coupled to a head pipe and disposed on a front portion of the vehicle body, and a bridge mounted to the head pipe, said system comprising:

actuating means connected to the vehicle body and to the bridge, the actuating means for providing a steering torque for steering of a motor cycle;

steering torque sensing means attached to the head pipe, the steering torque sensing means for detecting the steering torque provided by the actuating means; and controlling means mounted to the vehicle body and connected to the steering torque sensing means and to the actuating means, the controlling means comprising a target torque calculating means for obtaining a target torque for the steering on a basis of a state of the motorcycle and torque controlling means for driving the actuating means on a basis of a deviation between the target torque obtained from the target-torque calculating means and the steering torque obtained from the torque detecting means.

7. The steering assist system for a motorcycle according to claim 6, further comprising:

steering-angle-state detecting means for detecting a state concerning a steering angle of the steering, the steering-angle-state detecting means connected to the controlling means;

acceleration detecting means for detecting an acceleration in a vehicle-with direction of the motorcycle, the acceleration detecting means connected to the controlling means; and vehicle-speed detecting means for detecting a vehicle speed of the motorcycle, the vehicle-speed detecting means connected to the controlling means, wherein the target-torque calculation means obtains the target torque on a basis of the information obtained from the steering-angle-state detecting means, the acceleration in the vehicle-width direction obtained from the acceleration detecting means, and the vehicle speed obtained from the vehicle speed detecting means.

8. The steering assist system for a motorcycle according to claim 7, wherein the information obtained from the steering-angle-state detecting means is a steering-angle acceleration, and when the acceleration in the vehicle-width direction is equal to or larger than a first predetermined value and the steering-angle acceleration is equal to or larger than a second predetermined value, the actuator is driven and provides a steering torque to the steering.

9. The steering assist system for a motorcycle according to claim 7, wherein the target-torque calculation means obtains the target torque through an inverse operation using at least one of a vehicle-body-behavior transfer function that expresses the acceleration in the vehicle width direction with respect to the steering torque, and a vehicle-body-behavior transfer function that expresses the steering-angle acceleration with respect to the steering torque.

10. The steering assist system for a motorcycle according to claim 8, wherein the target-torque calculation means obtains the target torque through an inverse operation using at least one of a vehicle-body-behavior transfer function that expresses the acceleration in the vehicle width direction with respect to the steering torque, and a vehicle-body-behavior transfer function that expresses the steering-angle acceleration with respect to the steering torque.

11. A method for steering assist in a motorcycle, said method comprising:

obtaining a target torque for steering on a basis of a state of the motorcycle;

detecting a steering torque;

driving an actuator on a basis of a deviation between the target torque and the steering torque, thereby providing additional steering torque via the actuator.

12. A method according to claim 11, further comprising:

detecting a state concerning a steering angle of the steering of the motorcycle;

detecting an acceleration in a vehicle-width direction of the motorcycle;

detecting a vehicle speed of the motorcycle, wherein the target torque is obtained on a basis of information detected regarding the steering angle of the steering, the acceleration in the vehicle-width direction, and the vehicle speed.

13. A method as recited in claim 12, wherein the detecting of the state concerning a steering angle of the steering comprises steering-angle acceleration, and wherein when the acceleration in the vehicle-width direction is equal to or larger than a first predetermined value, and the steering-angle acceleration is equal to or larger than a second predetermined value, steering torque is provided to the steering.

14. A method as recited in claim 12, wherein the target torque is obtained through an inverse operation using at least one of a vehicle-body-behavior transfer function that expresses the acceleration in the vehicle-width direction with respect to the steering torque, and a vehicle-body-behavior transfer function that expresses the steering-angle acceleration with respect to the steering torque.

15. A method as recited in claim 13, wherein the target torque is obtained through an inverse operation using at least one of a vehicle-body-behavior transfer function that expresses the acceleration in the vehicle-width direction with respect to the steering torque, and a vehicle-body-behavior transfer function that expresses the steering-angle acceleration with respect to the steering torque.

* * * * *